United States Patent Office 3,822,323
Patented July 2, 1974

3,822,323
PRODUCTION OF HIGHLY FLUORINATED CHLOROFLUOROMETHANES AND TETRAFLUOROMETHANE
Volker Beyl, Leverkusen, Heinz Jonas, Opladen, Johann Nikolaus Meussdoerffer, Blecher, and Hans Niederprum, Monheim, Germany, assignors to Bayer Aktiengesellschaft, Leverkusen, Germany
No Drawing. Filed Apr. 4, 1972, Ser. No. 241,051
Claims priority, application Germany, Apr. 10, 1971,
P 21 17 570.2
Int. Cl. C07c 17/00, 19/08
U.S. Cl. 260—653                                        9 Claims

ABSTRACT OF THE DISCLOSURE

The process for the production of chlorofluoromethanes and tetrafluoromethane which comprises contacting chlorine and hydrogen fluoride with a cyanogen compound selected from the group consisting of hydrogen cyanide, cyanogen chloride and dicyanogen at a temperature in excess of about 500° C., and separating chlorofluoromethanes and tetrafluoromethane from the reaction product. Preferably the reaction is carried out by passage of the reactants in gaseous state at a temperature of about 700 to 900° C. and a pressure of about 0.5 to 2 atmospheres absolute over a fixed-bed catalyst comprising graphite or active carbon with a residence time of about 2 to 60 seconds, the chlorine being used up to 100% excess over the stoichiometrically needed amount based on the cyanogen compound (equation 4). The reaction product is treated to separate the chlorofluoromethanes and tetrafluoromethane therefrom and to separate the nitrogen and hydrogen chloride therefrom, the balance being recycled for further reaction.

---

This invention relates to a process for the production of perhalogenated chlorofluoromethanes, in particular to highly fluorinated chlorofluoromethanes, using hydrogen cyanide, cyanogen chloride or dicyanogen as a starting material.

At present the large-scale production of chlorofluoromethanes is carried out by the fluorination of carbon tetrachloride with hydrogen fluoride under pressure in the liquid phase in the presence of antimony (III/V)- catalysts, for example in accordance with the following reaction:

$$CCl_4 + 2HF \rightarrow CCl_2F_2 + 2HCl \qquad (1)$$

(Chemistry and Industry *1961*, Page 960).

In addition to this liquid-phase process, there are numerous processes for fluorinating carbon tetrachloride in the gaseous phase in the presence of suitable catalysts which also lead to chlorofluoromethanes (Chemistry and Industry *1961*, Page 961).

The major disadvantage of these processes is that in the conventional synthesis of chlorofluoroalkanes producing CFCl₃ and CF₂Cl₂ in a weight ratio of 30:70 from CCl₄, about 70% of the total raw-material costs are caused by the carbon tetrachloride used as starting material (European Chemical News *1967*, Sept. 15, Page 40).

There are also other processes in which, by simultaneous reaction with chlorine and hydrogen fluoride, relatively inexpensive hydrocarbons such as methane or methyl chloride are reacted to form the chlorofluoromethanes:

$$CH_4 + 4Cl_2 + 2HF \rightarrow CF_2Cl_2 + 6HCl \qquad (2)$$

(Chemistry and Industry *1961*, Page 961).

Unfortunately, these processes are accompanied by the disadvantage that relatively large quantities of hydrogen chloride containing hydrogen fluoride are formed as secondary products, being extremely difficult to work up.

In another process for the production of chlorofluoromethanes, carbon disulphide is chlorofluorinated for example in accordance with the following reaction:

$$CS_2 + 3Cl_2 + 2HF \rightarrow CF_2Cl_2 + S_2Cl_2 + 2HCl \qquad (3)$$

(Kinetic Chemicals, U.S. 2,004,932).

The disadvantage of this process is embodied in the inevitable accumulation of disulfur dichloride for which there is no significant utility.

Accordingly, the object of the invention is to provide a more economical starting material for the production of chlorofluoromethanes which minimizes the accumulation of hydrogen chloride containing hydrogen fluoride and which in addition only leads to secondary products whose separation and elimination does not involve any difficulties.

These and other objects and advantages are realized in accordance with the present invention pursuant to which a gaseous mixture of chlorine and hydrogen fluoride is contacted at a temperature in excess of about 500° C. with a cyanogen compound such as cyanide, cyanogen chloride or dicyanogen, in accordance with the following equation:

$$HCN + 5/2Cl_2 + nHF \rightarrow CF_nCl_{4-n} + (n+1)HCl + 1/2N_2 \qquad (4)$$

The reaction mixture is subsequently worked up into chlorofluoromethane and tetrafluoromethane.

Hydrogen cyanide is formed in very large quantities as an undesirable secondary product in the large-scale synthesis of acrylonitrile as a result of C-C-splitting and, hence, represents a far more economical starting material than carbon tetrachloride for the synthesis of chlorofluoromethanes. By virtue of the low hydrogen content of the hydrogen cyanide, the evolution of hydrogen chloride is kept to a minimum. In cases where cyanogen chloride or dicyanogen is used, the inevitable accumulation of hydrogen chloride is even further reduced.

Separation of the nitrogen does not present any problems at all.

In addition, by contrast to the hydrocarbons or the partially chlorinated hydrocarbons, no carbon is deposited nor any hexachlorobenzene formed in the chlorofluorination of hydrogen cyanide.

In cases where the reaction according to the invention is carried out with hydrogen cyanide as the starting material, cyanogen chloride accumulates as an intermediate product, being formed in a complete reaction even at low temperatures. Further reaction into the chlorofluoromethanes only takes place at temperatures above about 500° C. At temperatures of from about 500° C. to 600° C. and with residence times of from about 2 to 60 seconds, the conversions are less than about 5%, reaching as much as 30 to 50% at temperatures of from 700° C. to 900° C. Although temperatures higher than about 900° C. can be used, e.g. up to about 1000° C., they are uneconomical on material grounds.

Unlike other large-scale methods, the reaction proceeds with an adequate yield in the absence of catalysts. It is sufficient for the gaseous mixture to be passed through a heated zone with steps taken to ensure that the reagents are effectively intermixed. The reagents can be mixed either cold or preheated and subsequently introduced into the reaction zone. However, they can also be combined in the reaction zone itself. It is also possible for the reaction to be carried out in two stages, in which case the conventionally preheated gases are initially reacted to form cyanogen chloride, after which chlorofluoromethanes and tetrafluoromethane are obtained from the reaction mixture with a further supply of energy.

The reaction is advantageously carried out by passage of the gases over or through an inert fixed bed, preferably a graphite fixed bed or an active carbon fixed bed, although the sole function of the fixed bed is to provide for the effective, rapid transfer of heat from the heated reactor wall to the gaseous mixture.

Investigations have shown that the use of conventional fluorination catalysts, such as chromium oxide fluoride and aluminum fluoride, does not afford any appreciable advantages over fluorination-inactive catalysts at the temperatures used, i.e. from about 700° C. to 900° C.

It is already known that trifluorochloromethane is formed as a secondary product alongside hexafluoroazomethane as the main product in the reaction of cyanogen chloride with chlorine and sodium fluoride carried out in an autoclave over a period of some 6 hours at a temperature of from 200° C. to 300° C. (United States Patent Specification No. 2,912,429).

By the process according to the invention, however, it is possible to produce a mixture of the different chlorofluoromethanes as the main product with the highly fluorinated derivatives predominating. According to gas chromatograms of the reaction gases, a chlorofluoromethane mixture is obtained consisting by weight of 10 to 35% of $CF_4$, 50 to 75% of $CF_3Cl$, 3 to 10% of $CCl_2F_2$ and 0.1 to 3% of $CCl_3F$, largely irrespective of the reaction temperature. By introducing hydrogen fluoride in less than the quantity stoichiometrically necessary for the production of trifluorochloromethane, the degree of fluorination of the chlorofluoromethane mixture formed can be displaced somewhat in favour of the derivatives richer in chlorine, although this is offset by a decrease in the conversion.

In order to reach the aforementioned conversions, it is necessary to use an excess of preferably about 20 to 100% of chlorine, based on the cyanogen compound, in addition to an adequate quantity of hydrogen fluoride. If the chlorine is used in a much smaller or even in a larger quantity, the conversion falls.

The pressure of the reaction gases during reaction in the reactor can be lower than normal pressure (slight danger of emission of the reaction gases) or higher than normal pressure (in which case the reaction is promoted in thermodynamic terms), and is preferably in the range from about 0.5 to 2.0 atmosphere absolute. The reaction gases are reacted with greatest advantage in a reactor lined with graphite. Graphite guarantees resistance to the highly corrosive effect of the reaction gases.

According to results of investigations, the reaction gas on leaving the reactor does not contain any secondary or intermediate products other than nitrogen apart from excess chlorine and hydrogen fluoride, unreacted cyanogen chloride and the chlorofluoromethanes as the reaction products. This means that, by recycling unreacted cyanogen chloride to the reactor, chlorofluoromethanes can be obtained in a yield of almost 100%. Cyanogen chloride, chlorine and hydrogen fluoride can be separated off from hydrogen chloride and the chlorofluoromethanes by conventional methods, for example by absorption techniques, low-temperature distillation and rectification techniques, and returned to the process.

The process according to the invention is illustrated in the following Examples:

EXAMPLE 1

0.5 mole/hr. of hydrogen cyanide, 1.25 moles/hr. of chlorine and 1.5 moles/hr. of hydrogen fluoride were passed for 2 hours at a temperature of 600° C. through a 250 ml. capacity nickel reactor which was lined with a graphite tube and which was filled with a fixed bed of active carbon. The reaction gases issuing from the reactor were cooled by means of a water cooler and subsequently washed in a washing vessel filled with 3 liters of a solution of 350 g. of $Na_2SO_3.7H_2O$ and 350 g. of NaOH in water. These washed gases were then passed through a $CaCl_2$-tower, a KOH-tower and finally through concentrated $H_2SO_4$. The reaction gases thus freed from HCl, ClCN, HF and $H_2O$ were condensed in two traps cooled with liquid oxygen. Following evaporation, the composition of the condensate was quantitatively and qualitatively determined by gas chromatography and IR-spectroscopy. The residence time in the reactor under these test conditions was 3.7 seconds. According to analysis by gas chromatography, the condensate contained 25.6% by weight of $CF_4$, 59.8% by weight of $CF_3Cl$, 8.81% by weight of $CF_2Cl_2$ and 1.5% by weight of $CFCl_3$, corresponding to a conversion of chlorofluoromethanes of 10.5 mol percent, based on the hydrogen cyanide used.

EXAMPLE 2

The reaction was carried out as in Example 1, except that, on this occasion, the reaction temperature was 800° C. and the residence time 3.1 seconds. Analysis gave the following results: 11.6% by weight of $CF_4$, 79.6% by weight of $CF_3Cl$, 6.5% by weight of $CF_2Cl_2$ and 1.4% by weight of $CFCl_3$, corresponding to a conversion of chlorofluoromethanes of 30.1 mol percent.

EXAMPLE 3

As proof of the fact that, in the reaction of hydrogen cyanide, chlorine and hydrogen fluoride, no other compounds detectable by IR-spectroscopy are formed apart from the perhalogenated chlorofluoromethanes, cyanogen chloride and hydrogen chloride, the entire gas mixture leaving the reactor, after cooling by a water cooler, was passed through an IR-gas cell and fully condensed in a nickel trap cooled with liquid oxygen. The IR-spectrum of the gas samples showed that, apart from cyanogen chloride, hydrogen chloride and the chlorofluoromethanes, no other compounds detectable by IR-spectroscopy are formed during the reaction. The condensate in the nickel cold trap can almost completely be evaporated.

EXAMPLES 4a–4d

In order to establish a balance of material in the reaction of hydrogen cyanide, chlorine and hydrogen fluoride, the washing water was also worked up in further tests. These tests were carried out at temperatures of from 700 to 800° C. in a 1.4 liter capacity nickel reactor lined with a graphite tube. Hydrogen cyanide was introduced at a rate of 0.25 mole/hr., hydrogen fluoride at a rate of 1.0 mole/hr. and chlorine at a rate of 1.0 mole/hr.

In each instance, the test period was 4 hours with an average residence time of the reaction gases in the reactor of 27 seconds. The gases were washed out with a solution of 750 g. of potassium hydroxide and 250 g. of $NaSO_3.7H_2O$.

The nitrogen content of this washing solution was determined by Kjeldahl analysis:

| | Mole percent | | | | | | |
| --- | --- | --- | --- | --- | --- | --- | --- |
| | A | B | C | D | C | F | G |
| | $CF_4$ | $CF_3Cl$ | $CF_2Cl_2$ | $CFCl_3$ | HCN conversion into chlorofluoroalkanes | HCN conversion into ClCN in the washing water | Total |
| 4a | 9.7 | 25.8 | 1.9 | 0.07 | 37.5 | 60.0 | 97.5 |
| 4b | 18.9 | 27.3 | 1.2 | 0.07 | 47.5 | 45.0 | 92.5 |
| 4c | 2.6 | 18.7 | 1.4 | 0.07 | 22.8 | 76.5 | 99.1 |
| 4d | 8.4 | 30.2 | 3.6 | 0.3 | 42.5 | 49.3 | 91.8 |

What is claimed is:

1. The process for the production of chlorofluoromethanes and tertafluoromethane which comprises contacting chlorine and hydrogen fluoride with a cyanogen compound selected from the group consisting of hydrogen cyanide, cyanogen chloride and dicyanogen at a temperature from about 500° C. to 900° C., and separating chlorofluoromethanes and tetrafluoromethane from the reaction product.

2. A process as claimed in Claim 1, wherein the reaction is carried out at a temperature from about 700° C. to 900° C.

3. A process as claimed in Claim 1, wherein the reaction is carried out at a pressure of about 0.5 to 2.0 atmospheres absolute.

4. A process as claimed in Claim 1, wherein the reaction is carried out by passage of the reactants in gaseous state over an inert fixed bed.

5. A process as claimed in Claim 4, wherein the fixed bed consists essentially of graphite or active carbon.

6. A process as claimed in Claim 1, wherein the reaction is carried out by passage of the reactants in gaseous state through a reaction zone with a residence time of from about 2 to 60 seconds.

7. A process as claimed in Claim 1, wherein the chlorine is used in about 20 to 100% excess based on the cyanogen compound.

8. A process as claimed in Claim 1, wherein the reaction product is treated to separate the chlorofluoromethanes and tetrafluoromethane therefrom and to separate the nitrogen and hydrogen chloride therefrom, the balance being recycled for further reaction.

9. A process as claimed in Claim 8, wherein the reaction is carried out by passage of the reactants in gaseous state at a temperature of about 700 to 900° C. and a pressure of about 0.5 to 2 atmospheres absolute over an inert fixed bed consisting essentially of graphite or active carbon with a residence time of about 2 to 60 seconds, the chlorine being used in about 20 to 100% excess based on the cyanogen compound.

References Cited

UNITED STATES PATENTS 2,980,739   4/1961   Farlow _____ 260—653.3

DANIEL D. HORWITZ, Primary Examiner